United States Patent
Sanchez

(12)
(10) Patent No.: US 6,588,799 B1
(45) Date of Patent: Jul. 8, 2003

(54) VEHICLE ANTI-ROLLOVER DEVICE

(76) Inventor: Angelo Sanchez, 26 Tulip Ct., Nanuet, NY (US) 10954

( * ) Notice: Subject to any disclaimer, the term of this patent is extended or adjusted under 35 U.S.C. 154(b) by 0 days.

(21) Appl. No.: 09/829,408

(22) Filed: Apr. 9, 2001

Related U.S. Application Data

(60) Provisional application No. 60/260,311, filed on Jan. 9, 2001.

(51) Int. Cl.[7] .............................. B60R 21/00; B60S 9/00
(52) U.S. Cl. ....................................... 280/755; 280/756
(58) Field of Search .................................. 280/755, 756

(56) References Cited

U.S. PATENT DOCUMENTS

| | | | | |
|---|---|---|---|---|
| 1,231,531 A | * | 6/1917 | Shilling ....................... 280/755 |
| 1,373,655 A | * | 4/1921 | Daniel et al. ................ 280/755 |
| 3,838,783 A | * | 10/1974 | Tune .......................... 187/204 |
| 3,917,094 A | * | 11/1975 | Magneson ................... 114/372 |
| 4,050,526 A | * | 9/1977 | Deike ......................... 173/115 |
| 5,839,758 A | * | 11/1998 | Finch et al. ................ 280/756 |
| 5,931,499 A | * | 8/1999 | Sutherland .................. 280/755 |
| 6,086,082 A | * | 7/2000 | Andol ......................... 150/166 |
| 6,345,807 B1 | * | 2/2002 | Cacciatore .................. 254/124 |
| 6,394,738 B1 | * | 5/2002 | Springer ..................... 187/232 |

* cited by examiner

*Primary Examiner*—Paul N. Dickson
*Assistant Examiner*—Toan C To
(74) *Attorney, Agent, or Firm*—Eugene C. Rzucidlo

(57) ABSTRACT

A mechanical device extends the wheel base of the vehicle so as to prevent vehicle rollover when the vehicle tilts. The device comprises a sliding steel bar or rod with a wheel or cylindrical ball joint at the terminal end that will slide out from a vehicle when the vehicle begins to tilt. The bar/rod extends to the side at the front and rear of the vehicle to a point where it touches the road to prevent further tilt or rollover. The sliding bar/rod is enclosed in a sleeve that is attached to the frame, bumper or body of the vehicle, so that the load of the vehicle can be absorbed, preventing tilting or rollover.

3 Claims, 8 Drawing Sheets

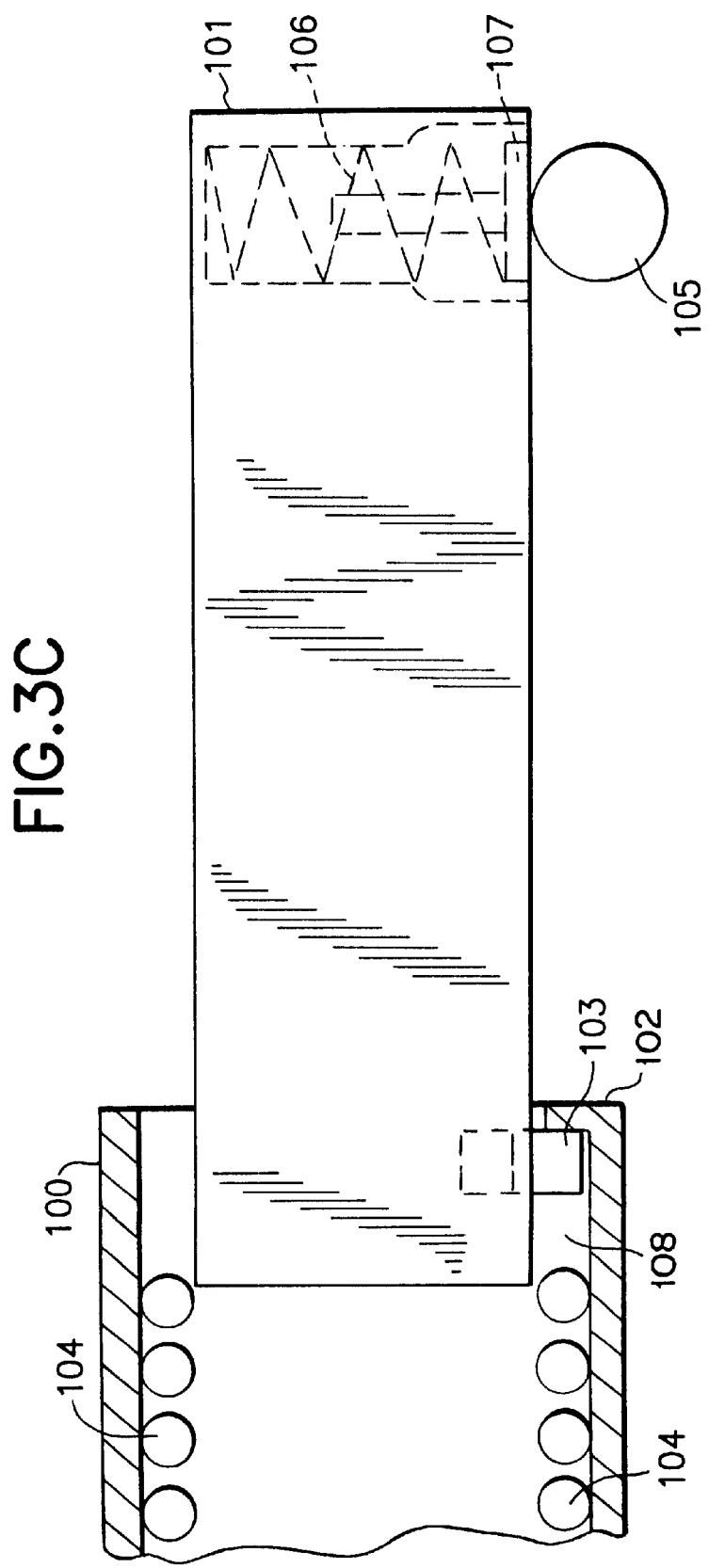

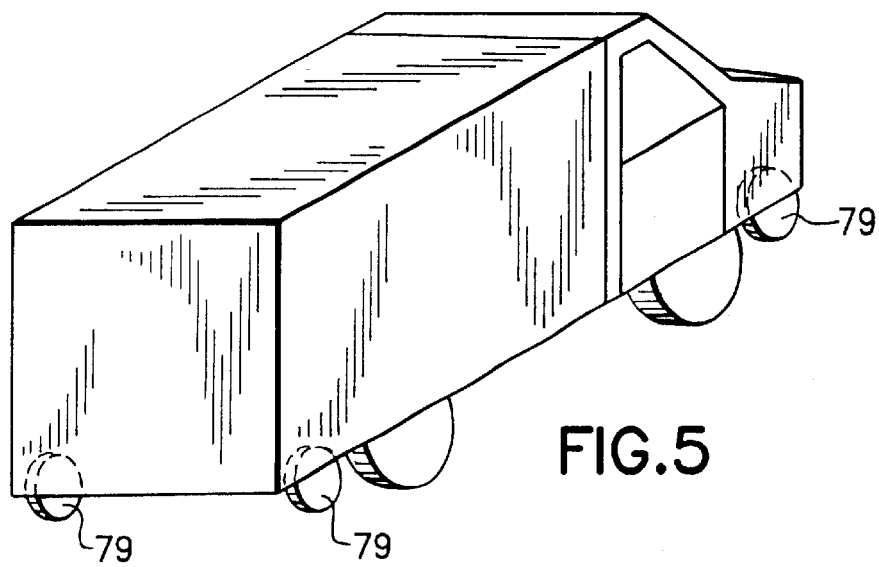
FIG.5
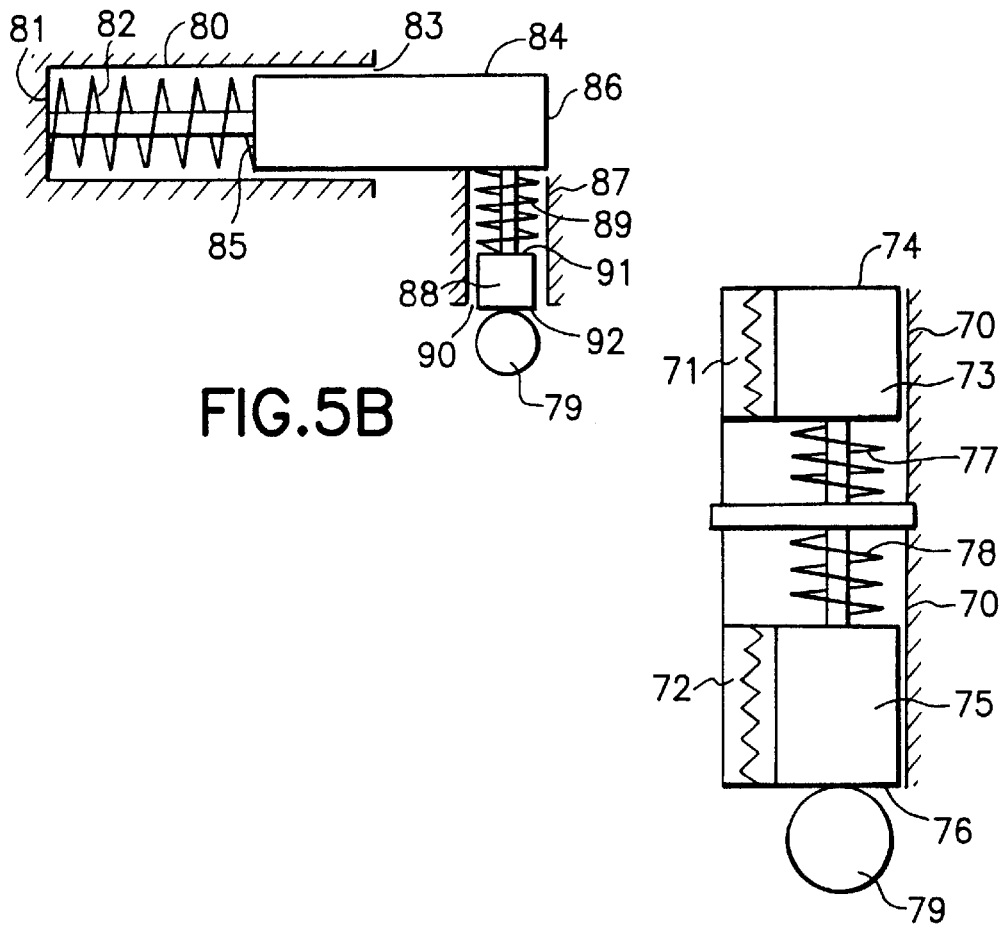
FIG.5B
FIG.5A

VEHICLE ANTI-ROLLOVER DEVICE

CROSS REFERENCES TO RELATED U.S. APPLICATIONS

This application claims priority from "Vehicle Anti-Roll Over Device", U.S. Provisional Patent Application No. 60/260,311, filed Jan. 9, 2001, by Sanchez, the contents of which are incorporated herein by reference.

FIELD OF THE INVENTION

This invention relates to a device used to prevent a vehicle from tilting or rolling over on its side. This device is applicable to new or previously owned vehicles, such as SUVs, truck, vans, or automobiles.

BACKGROUND OF THE INVENTION

With the popularity of high center of gravity vehicles, the incidence of accidents involving roll-overs and tire blowouts has increased, with ensuing injuries and loss of life. Thus, there is a need for a device that can prevent vehicle tilt and rollover.

SUMMARY OF THE INVENTION

The purpose of the invention is accomplished by a mechanical device that extends the wheel base of the vehicle. In one embodiment, the device comprises a sliding steel bar or rod with a wheel or cylindrical ball joint at the terminal end that will slide out from a vehicle when the vehicle begins to tilt. The bar/rod extends to the side at the front and rear of the vehicle to a point where it touches the road to prevent further tilt or rollover. The sliding bar/rod is enclosed in a sleeve that is attached to the frame, bumper or body of the vehicle, so that the load of the vehicle can be absorbed, preventing tilting or rollover. In an alternative embodiment, the device comprises vertically mounted swinging arm hinged from the top of a fixed arm with a holding arm connecting the swinging arm and the fixed arm so as to control the extension of the swinging arm.

BRIEF DESCRIPTION OF THE DRAWINGS

FIG. 3C depicts the stopper of the roller mounted sliding bar.

FIG. 5 depicts how an alternative embodiment of a vertical bar is mounted to the vehicle.

FIG. 5A depicts a schematic of the alternative embodiment of the vertical bar.

FIG. 5B depicts combination vertical-horizontal embodiment of the invention.

DETAILED DESCRIPTION OF THE INVENTION

Figure 1A:
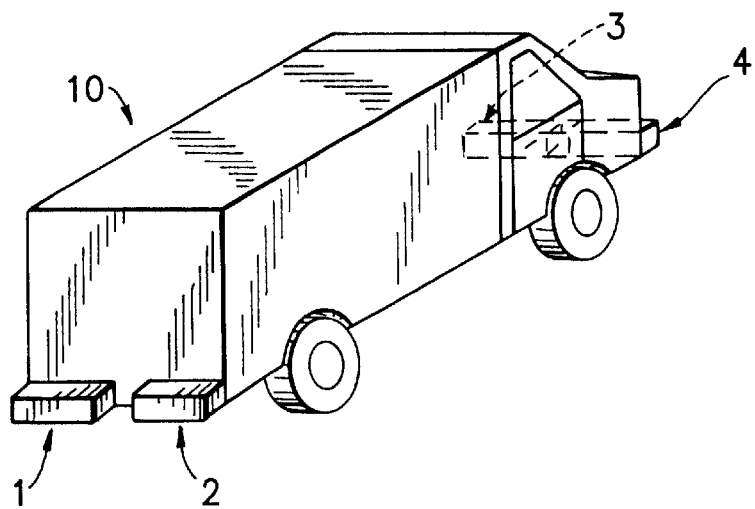
FIG. 1A depicts the mountings of the bar of the invention in a horizontal embodiment of the invention.

An overview of the system of the present invention is depicted in FIG. 1. Vehicle 10 has four horizontal anti-rollover devices 1, 2, 3, 4, two disposed at each end on opposite sides of the vehicle. A horizontal embodiment of the invention is depicted in greater detail in FIG. 2. A sliding bar 21 slides within a hollow sleeve 22 that is mounted horizontally within the frame of vehicle 24. When the vehicle tilts, as indicated in the diagram, the bar slides out of the sleeve. The bar 21 also includes a wheel or ball joint 23 disposed on the end that slides out of the sleeve. As the vehicle tilts, the wheel or ball joint 23 can make contact with the road so as to prevent rollover. The bar can also include a spring, as depicted in FIG. 2a, to control the release of the bar from the vehicle. Thus, bar 21 only as far as necessary from the vehicle to prevent rollover.

Figure 3A:
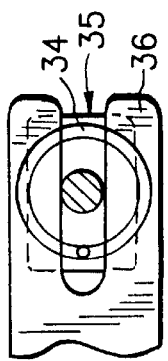
FIG. 3A is a sectional view of the geared slider.
Figure 3:
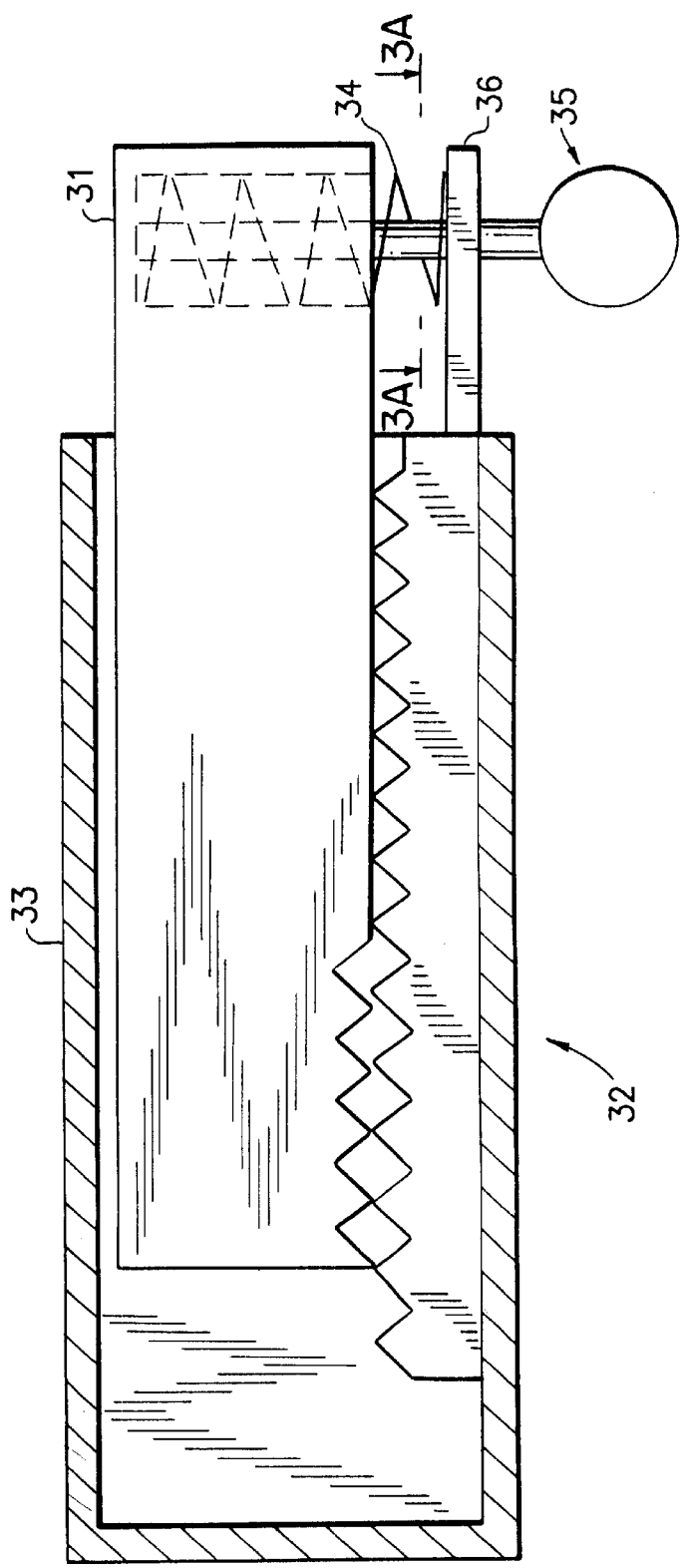
FIG. 3 depicts a schematic of a geared slider.

An alternative horizontal embodiment of the invention is depicted in FIG. 3A. In this embodiment, sleeve 33 includes gears 32, and sliding bar 31 is geared so that the gears of bar 31 match the gears 32 of sleeve 33. These gears are spaced and slanted so that the bar 31 can slide out of sleeve 33 but also lock so as to prevent motion in the opposite direction. The bar also includes a wheel or ball joint 35 that is spring 34 loaded, wherein the spring is retained by retaining yoke 36 until the bar 31 is fully extended, at which time the ball joint or wheel 35 is released to make contact with the ground.

Figure 3B:
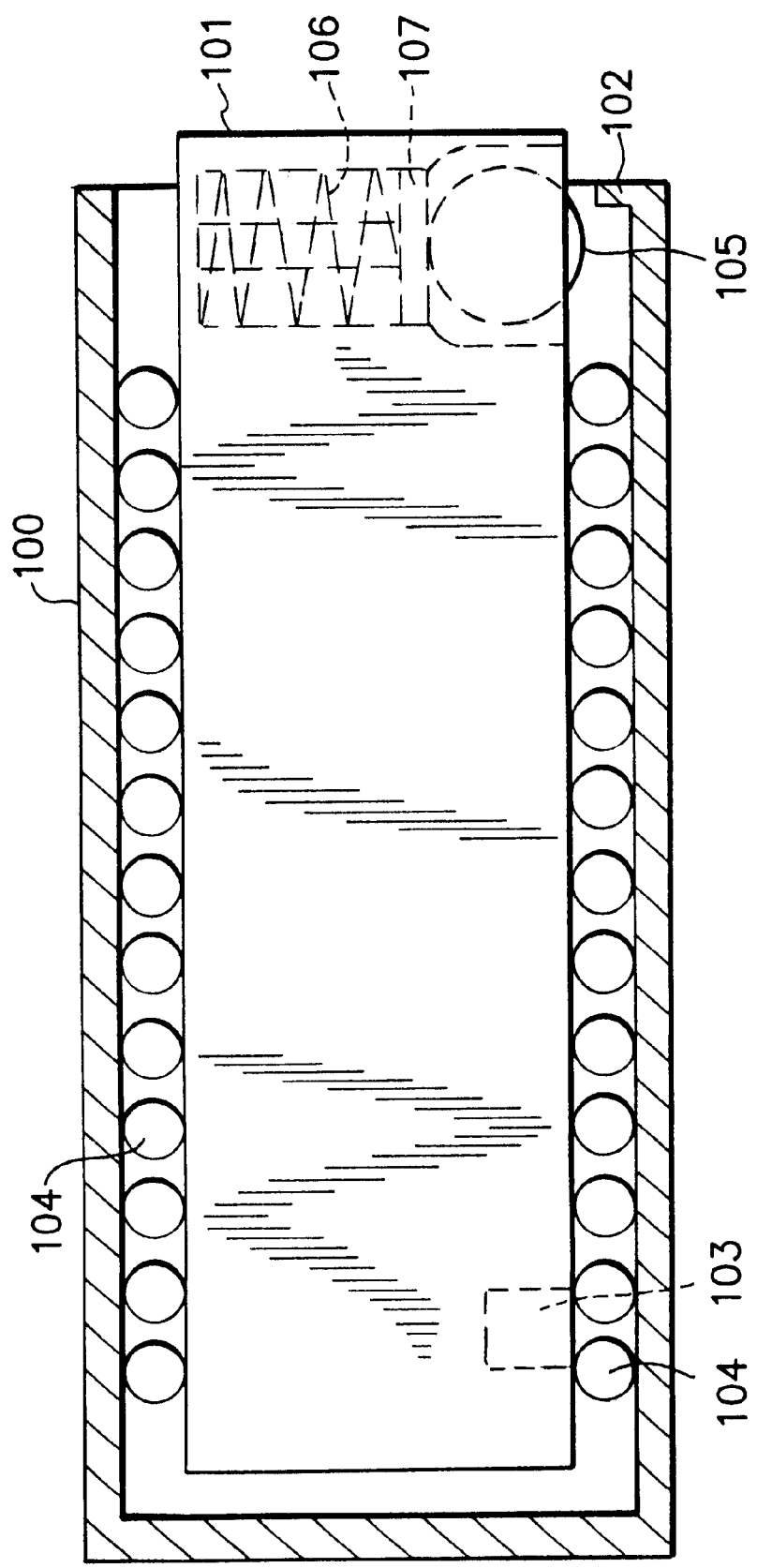
FIG. 3B depicts a roller mounted sliding bar.

An second alternative horizontal embodiment of the invention is depicted in FIG. 3B. In this embodiment, sleeve 100 includes a plurality of rollers 104 on the upper and lower inner surfaces of the sleeve 100 so as to minimize the friction between the sleeve 100 and sliding bar 101. Sliding bar 101 rolls on the rollers 104, and includes a first recessed stopper 103 that engages a second stopper 102 disposed on the sleeve 100 to control the extension of sliding bar 101. Between the rollers 104 and the second stopper 102 is a space 108. The first recessed stopper is held in place by the rollers 104 as the sliding bar extends out of the sleeve 100, extending into the space 108 to engage second stopper 102. The sliding bar 101 also includes a wheel or ball joint 104 that is spring 106 loaded, wherein the spring is retained by retaining yoke 107 until the bar 101 is fully extended, at which time the ball joint or wheel 105 is released to make contact with the ground.

Figure 1B:
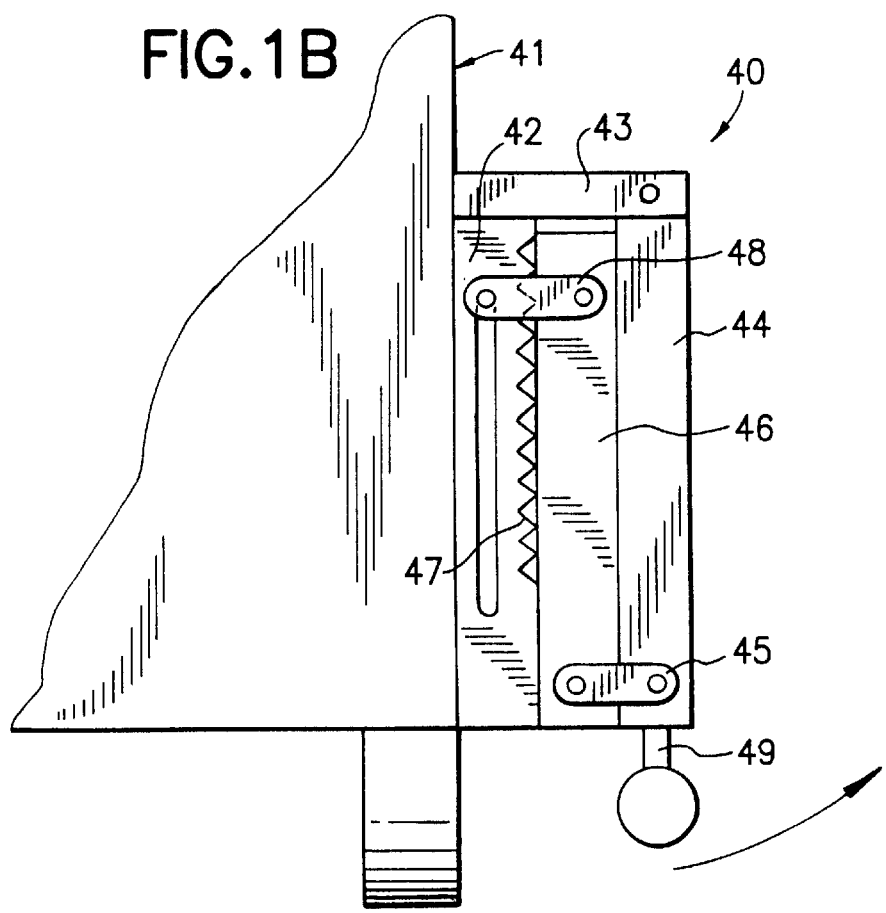
FIG. 1B depicts the bar of the invention mounted in a vertical embodiment of the invention.
Figure 2:
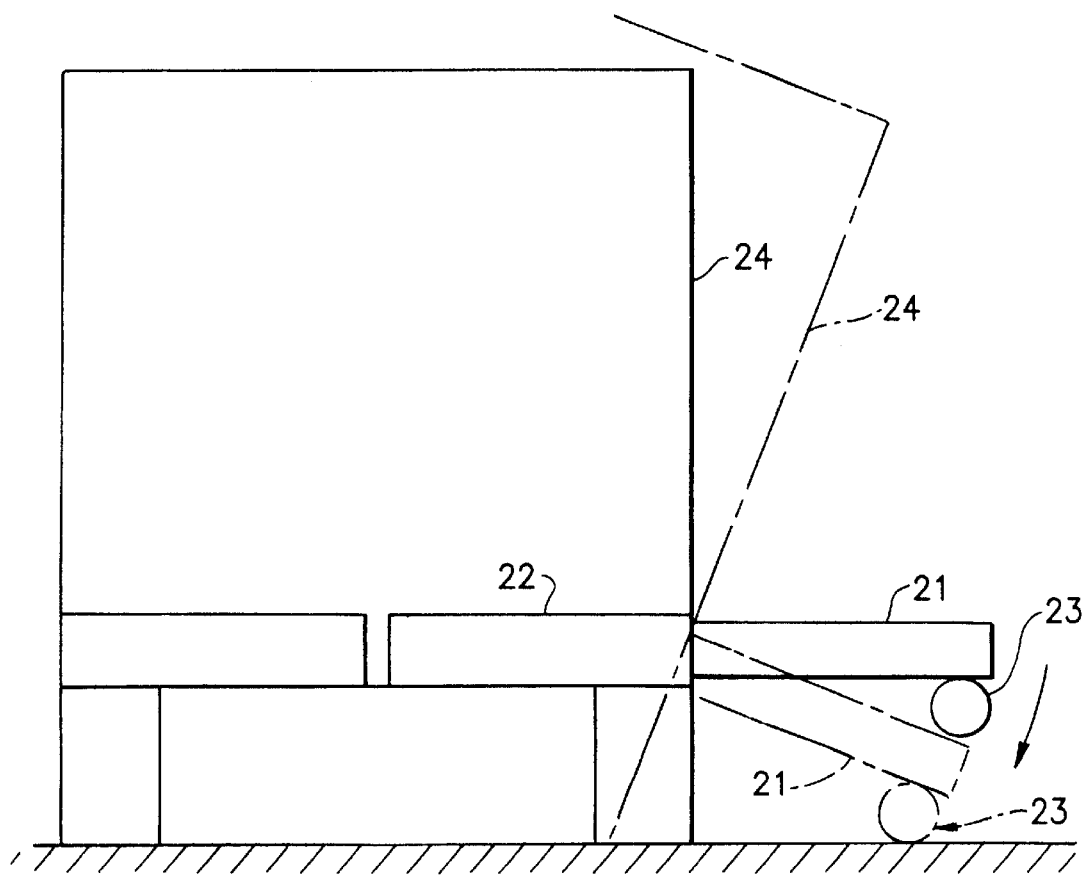
FIG. 2 depicts how the horizontal embodiment of the invention prevents rollover.
Figure 2A:
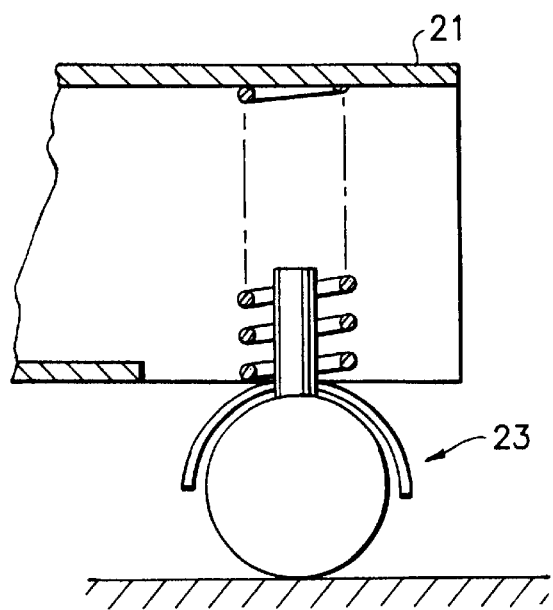
FIG. 2A depicts a spring loaded horizontal embodiment.
Figure 4:
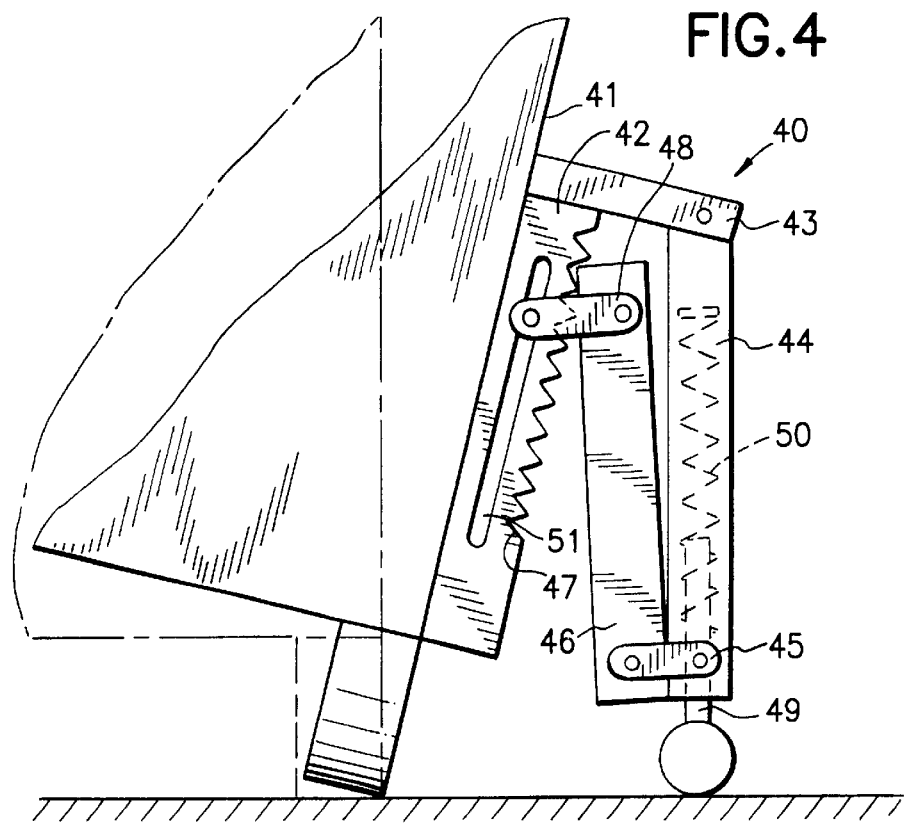
FIG. 4 depicts how a vertically mounted bar prevents rollover.

A vertical embodiment of the invention is depicted in FIG. 4 and FIG. 1B. Device 40 is shown vertically attached to vehicle 41, and includes fixed geared arm 42 vertically attached to vehicle 41, wherein the fixed geared arm 42 is slotted. The fixed geared arm 42 has a hinge 43 at the top, to which a hollow swinging arm 44 is attached. The hollow swinging arm 44 also has a hinge 45 attached at its bottom end, which connects to a geared holding arm 46. The geared holding arm 46 is geared so as engage the gears 47 of the fixed geared arm 42 in one direction. This helps support the weight placed on the swinging arm 44 by a tilting vehicle. At the upper end of the geared holding arm 47 is a holding bar retainer 48 adapted to engage the slots on the fixed geared arm 42 so as to prevent the swinging arm 44 from extending beyond a vertical plane as a vehicle tilts. A bar rod 49 is disposed within the hollow swinging arm 44, attached to the upper end of swinging arm 44 by a loaded spring 50. As the hollow swinging arm 44 extends out from a tilting vehicle, the rod 49 extends from the bottom end of swinging arm 44 to make contact with the ground, preventing rollover. The bar rod's 49 extension can also be controlled by compressing a spring against a spring retaining yoke, as depicted in FIG. 4B.

Figure 4B:
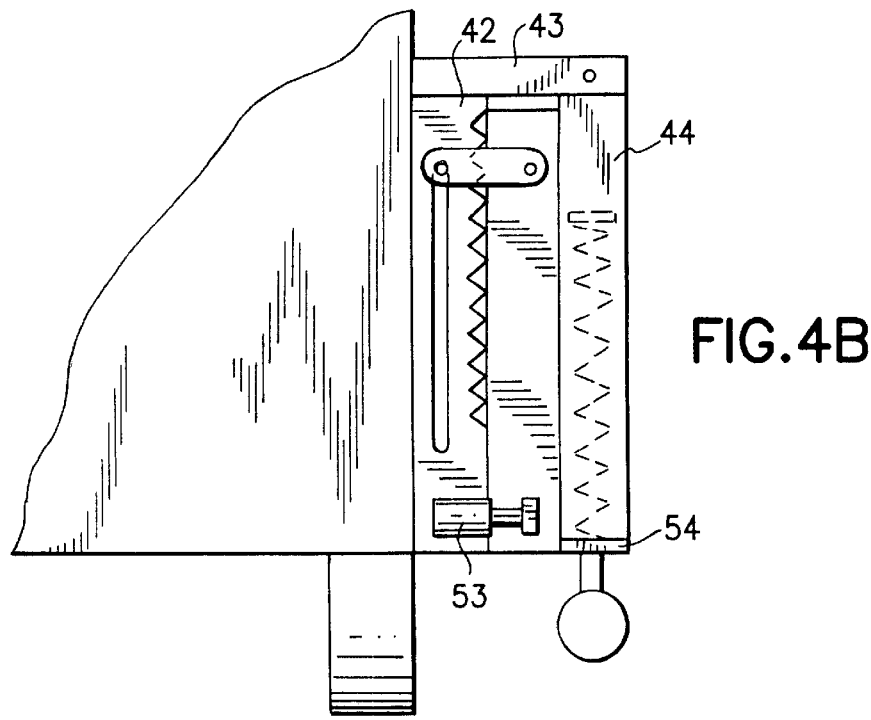
FIG. 4B is a partial view of the vertical bar.

A variation on this vertical embodiment is depicted in FIG. 4B. In this embodiment, the anti-tilt device includes a electro-mechanical device 53, such as a solenoid, with a level-sensing'switch that releases the swinging arm and controls the extension of the bar rod.

An alternative vertical embodiment is depicted in FIG. 5A. This embodiment includes a hollow cylinder 70 disposed between the body and frame of a vehicle. On the inside of cylinder 70 are stop gears 71, 72 disposed at each end of the cylinder, an upper piston 73 adapted to move toward an upper end 74 of the cylinder 70, and a lower piston 75 adapted to move toward a lower end 76 of the cylinder 70. A pair of extension systems 77, 78, which can be either springs or hydraulics act to move the pistons 73, 75 toward their respective ends, and the stop gears 71, 72 act to hold the pistons in place. A level-sensing switch activates the extension release, such as, for example, a solenoid, to extend the pistons. Thus, when activated, the upper piston acts to level the body of the vehicle, while the lower piston causes a wheel or ball joint 79 to extend to the ground to prevent rollover. The placement of the alternative embodiment on a vehicle is depicted in FIG. 5.

Another variation of the vertical embodiment of FIG. 5A is depicted in FIG. 5B. This embodiment includes a horizontal hollow cylinder 80 with a closed end 81 fixed to a vehicle body, and an open end 83. Inside hollow cylinder 80 is disposed a horizontal piston 84 with a first end 85 and a second end 86. A horizontal extension system 82 connects the first end 85 of horizontal piston 84 to the closed end 81 of the horizontal hollow cylinder 80. A vertical hollow cylinder 87 is disposed on the underside of horizontal piston 84 adjacent to its second end 86. The lower end 90 of the vertical cylinder 87 is open. Inside vertical cylinder 87 is a vertical piston 88 with an upper end 91 and a lower end 92, and a vertical extension system 87 that connects the upper end 91 of vertical piston 88 to the underside of horizontal piston 84. A wheel or ball joint 79 is attached to the lower end 92 of vertical piston 88. The horizontal extension system 82 and vertical extension 89 can include springs or hydraulics. When the vehicle begins to tilt, a level-sensing switch activates the release of horizontal extension system 82 and vertical extension 89. Horizontal extension system 82 expands pushing horizontal piston 84 out of the open end 83 of the hollow cylinder 80. As horizontal piston 83 emerges from hollow cylinder 80, vertical extension system 89 expands so that vertical piston 88 emerges from vertical cylinder 87, extending downward until wheel or ball joint 79 makes contact with the ground.

Figure 6A:
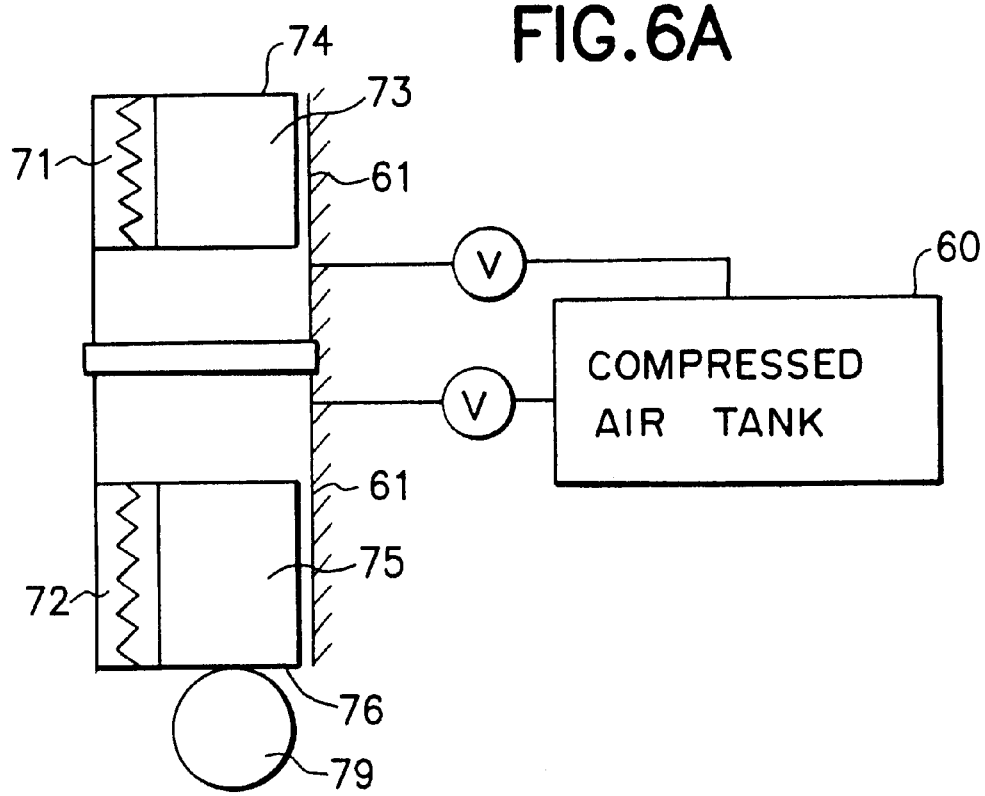
FIG. 6A depicts an embodiment employing compressed-air vertical pistons.

FIG. 6A depicts an alternative embodiment of the vertical pistons, in which compressed air is utilized to extend the pistons to their respective ends of the cylinder. A compressed air tank 60 is the source of the compressed air pumped into cylinder 61 when the vehicle begins to tilt. The pumping is actuated by a level-sensing device.

Figure 6B:
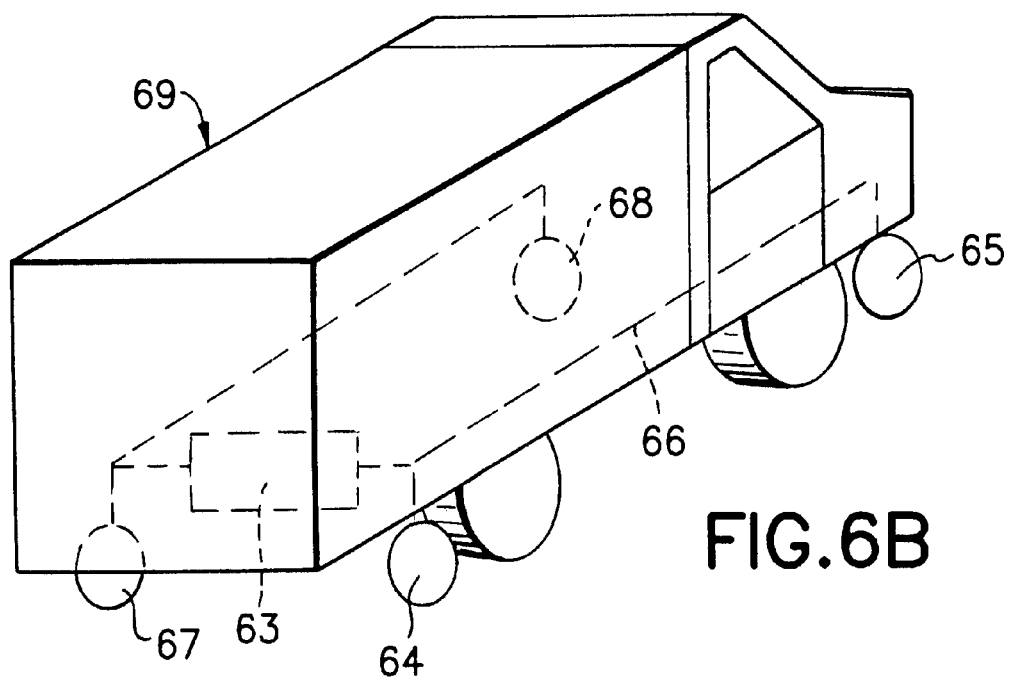
FIG. 6B depicts an embodiment employing compressed air bags.

FIG. 6B depicts another alternative of the invention. This embodiment employs a plurality of air bags 64, 65, 67, 68 connected by an air line 66 to a compressed air tank 63. The embodiment pictured includes two air bags on each side of a vehicle 69, disposed at the front and the rear of vehicle 69. A level-sensing switch activates the tank 63 to pump compressed air into bags on the proper side of the vehicle 69 so as to level the vehicle 69.

The system of the invention is not limited to the embodiments disclosed herein. It will be immediately apparent to those skilled in the art that variations and modifications to the disclosed embodiment are possible without departing from the spirit and scope of the present invention. The invention is defined by the appended claims.

What is claimed is:

1. A device for preventing vehicle tilt or rollover comprising:

a fixed geared arm vertically attached to a vehicle, the fixed geared arm further comprising at least one slot;

a hollow swinging arm hingedly attached to the top of said fixed geared arm;

a geared holding arm hingedly attached to the bottom end of the hollow swinging arm, said geared holding arm adapted to engage said fixed gear arm in one direction to help support weight placed on said swinging arm by a tilting vehicle;

a holding bar attached to both the upper end of the geared holding arm and the one or more slots on the fixed geared arm so as to keep the swinging arm from extending beyond a vertical plane as a vehicles tilts; and a bar rod contained within the hollow swinging arm, said bar rod attached via a spring to an inner surface of the top of the hollow swinging arm, wherein the bar rod extends from the bottom of the hollow swinging arm as the hollow swinging arm extends from the side of a tilting vehicle so as to prevent rollover.

2. The device of claim 1, further comprising an electro-mechanical device comprising a level-sensing switch to control the release of the swinging arm and to control the extension of the bar rod.

3. The device of claim 2, wherein the electro-mechanical device is a solenoid.

* * * * *